(12) United States Patent
Chiu

(10) Patent No.: US 6,538,398 B1
(45) Date of Patent: Mar. 25, 2003

(54) CATHODE RAY TUBE DRIVER CIRCUIT WITH CATHODE CURRENT DETECTION

(75) Inventor: Hon Kin Chiu, Hayward, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/923,463

(22) Filed: Aug. 6, 2001

(51) Int. Cl.⁷ .............................. G09G 1/04; H04N 5/68
(52) U.S. Cl. .................... 315/387; 315/396; 315/382.1; 348/380; 348/381; 348/707
(58) Field of Search .................... 315/387, 382.1, 315/388, 389, 396, 395, 365; 348/380, 381, 707

(56) References Cited

U.S. PATENT DOCUMENTS 5,680,173 A * 10/1997 White et al. ................. 348/380
6,353,367 B1 * 3/2002 Chiu .......................... 330/311
6,424,324 B1 * 7/2002 White et al. .................. 345/11

* cited by examiner

*Primary Examiner*—Don Wong
*Assistant Examiner*—Tuyet T. Vo
(74) *Attorney, Agent, or Firm*—Wagner, Murabito & Hao LLP

(57) ABSTRACT

A circuit for driving a cathode ray tube (CRT) with cathode current detection. Specifically, the present invention discloses a CRT driver circuit comprising a push-pull configuration comprising upper and lower stages of darlington paired transistors. In the lower stage, a lower prestage circuit generates a video output signal in response to a video input signal that is amplified to drive a cathode electrode of a coupled CRT. In the upper stage, an upper prestage circuit of transistors drives a voltage divider for splitting a high voltage supply between the transistors in the lower prestage circuit. In both the upper and lower stages of darlington paired transistors, upper and lower output stages of transistors are electrically active only during transient periods of the video input signal. As such, a cathode current from a static test signal can be measured from an output through the lower prestage circuit.

21 Claims, 6 Drawing Sheets

CATHODE RAY TUBE DRIVER CIRCUIT WITH CATHODE CURRENT DETECTION

BACKGROUND OF THE INVENTION

1. Field of the Invention

The present invention relates to the field of cathode ray tube drivers. More specifically, the present invention relates to the field of cathode ray tub driver circuits with cathode current detection capabilities for high resolution display applications.

2. Related Art

Digital television formats such as high definition television (HDTV) and enhanced definition television (EDTV) provides for increased resolution in the television picture. The improvements in picture quality is accomplished via a new broadcasting standard that implements a wider bandwidth and higher frequencies than previously required for use with conventional television units. As such, supporting circuitry in televisions must be adapted to perform under the new broadcasting standard, such as the one supporting HDTV.

One component that needs adapting to the higher bandwidth and higher frequencies of the digital television formats is the cathode ray tube (CRT) driver used for amplifying a video input signal and generating a video output signal that drives a cathode in a television CRT.

In the past, CRT drivers for conventional televisions consisted of discrete circuits capable of easily handling the high power supplies necessary to run the CRT. The discrete circuits also could easily handle the lower frequencies and lower bandwidths of the analog broadcasting signal.

In contrast, discrete CRT drivers are incapable of driving the high resolution televisions capable of displaying digitally broadcast signals, such as HDTV and EDTV. The digital television standards require higher operating frequencies, higher speeds, and wider bandwidths. For example, the HDTV broadcasting standard requires double the operating frequency and triple the bandwidth of conventional television broadcasting signals. The detrimental effects of stray capacitance from components inherent in the CRT driver circuitry and corresponding printed circuit board (PCB) trace capacitance in discrete CRT drivers are increased in the higher frequencies and wider bandwidths of digital television broadcasting formats. This results in a television picture that is of poor quality.

In addition, it is desirous for the CRT driver circuit to have cathode current detection. Over time, the cathode in the electron gun of the CRT will deteriorate. This deterioration leads to a fluctuation in the cathode current which leads to a deterioration in color on the television display. The ability to measure the cathode current allows for recalibration of the electron gun in the CRT so that the magnitude of current generated by the cathode, in response to a test input signal, is consistent over time.

In one prior art example, the kinescope driver apparatus as disclosed in the White et. al patent ("Kinescope Driver Apparatus," U.S. Pat. No. 5,680,173), provides for cathode current detection as a measure of the voltage at an output node. FIG. 1 of the prior art is a schematic diagram of the White et. al circuit that illustrates a complementary push-pull emitter follower amplifier.

However, the White et. al circuit is incapable of accurately measuring the cathode current in its entirety as shown in FIG. 1 of the prior art. The output node 15 is coupled to a Class A emitter follower feedback control block 60 that is always on. As such, the current through the feedback control circuit 60 of FIG. 1 cannot be ignored and affects the cathode current measured at the output node 15.

For instance, the Q8 transistor in FIG. 1 is configured as an emitter follower. As such, its quiescent current is quite high, especially in a high-speed amplifier application (e.g., for HDTV). The higher speeds necessary to run a digital television application consumes more power and more current. Since the collector current of transistor Q8 is high, the base current of the Q8 transistor cannot be ignored. The higher the base current of the Q8 transistor, the higher the error for measuring cathode current in the Ik (cathode current) sense block 40. Thus, the cathode current measured in block 40 is not a true measurement of the cathode current since a large current through the feedback control block 60 exists.

Thus, there is a need for CRT driver circuits that are capable of handling the higher frequency and the higher bandwidths of the broadcast signal for digital television formats. Also, there is a need for CRT driver circuits that are capable of accurately measuring cathode current from the CRT.

SUMMARY OF THE INVENTION

Accordingly, a cathode ray tube (CRT) driver circuit suitable for high resolution display applications that also measures cathode current from a CRT is described. The present invention provides for a CRT driver circuit that is capable of handling the higher broadcast signal frequencies, higher operating speeds, and wider bandwidths of the broadcast signal for digital television formats. Additionally, the present invention provides the above accomplishment and is further capable of accurately measuring cathode current from the CRT.

Specifically, the present invention discloses a CRT driver circuit comprising a push-pull configuration comprising upper and lower stages of darlington paired transistors. The upper stage is comprised of two pairs of transistors arranged in darlington configuration. The two pairs of darlington configured transistors are coupled in series and form an upper prestage circuit and an upper output circuit. The lower stage is also comprised of two pairs of transistors arranged in darlington configuration. The two pairs of darlington configured transistors are coupled in series and a lower prestage circuit and a lower output circuit.

In the lower stage, the lower prestage circuit generates a video output signal in response to a video input signal that is amplified to drive a cathode electrode of a coupled CRT. In the upper stage, an upper prestage circuit of transistors drives a voltage divider for splitting a high voltage supply between the transistors in the lower prestage circuit.

In both the upper and lower stages of darlington paired transistors, upper and lower output stages of transistors are electrically active only during transient periods of the video input signal. As such, a cathode current from an effectively static test signal can be accurately measured from an output coupled to the lower prestage circuit.

The CRT driver circuit is formed as an integrated chip (IC chip). The IC chip formation reduces the internal stray capacitance and printed circuit board (PCB) external capacitance so that the CRT driver circuit can handle the higher frequencies, higher operating speeds, and wider bandwidths required for displaying broadcasting signals of digital television formats.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

PRIOR ART

DETAILED DESCRIPTION OF THE INVENTION

Reference will now be made in detail to the preferred embodiments of the present invention, a cathode ray tube (CRT) driver circuit suitable for high resolution display applications with cathode current detection capabilities, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, a cathode ray tube (CRT) driver circuit that measures cathode current from a CRT is described. The present invention provides for a CRT driver circuit that is capable of handling the higher signal frequencies, higher operating speeds, and wider bandwidths for displaying broadcast signals following digital television formats. Additionally, the present invention provides the above accomplishment and is further capable of accurately measuring cathode current from the CRT.

Figure 1:
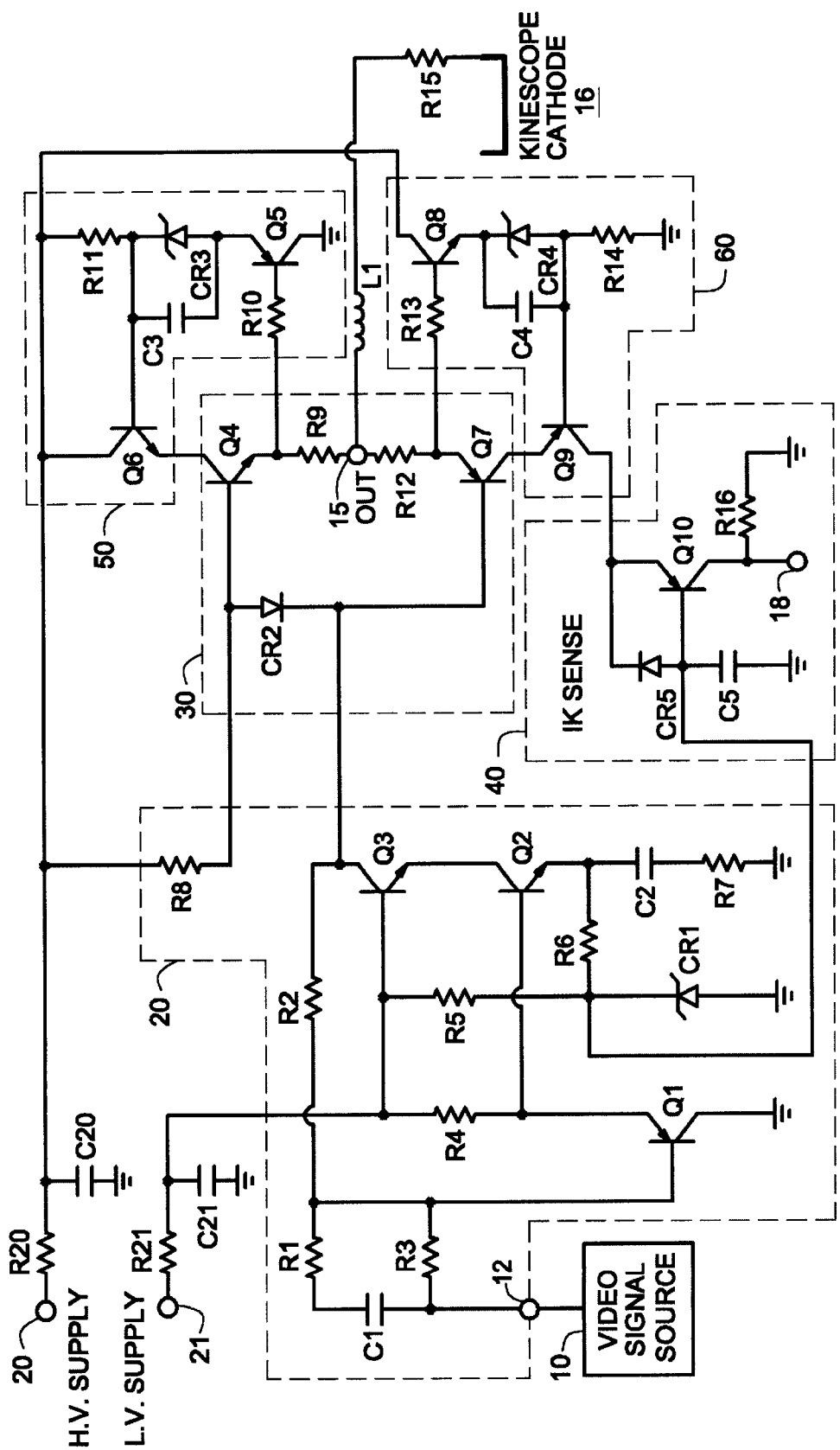
FIG. 1 is schematic diagram of a kinescope driver circuit that is incapable of accurately measuring the a current.
Figure 2:
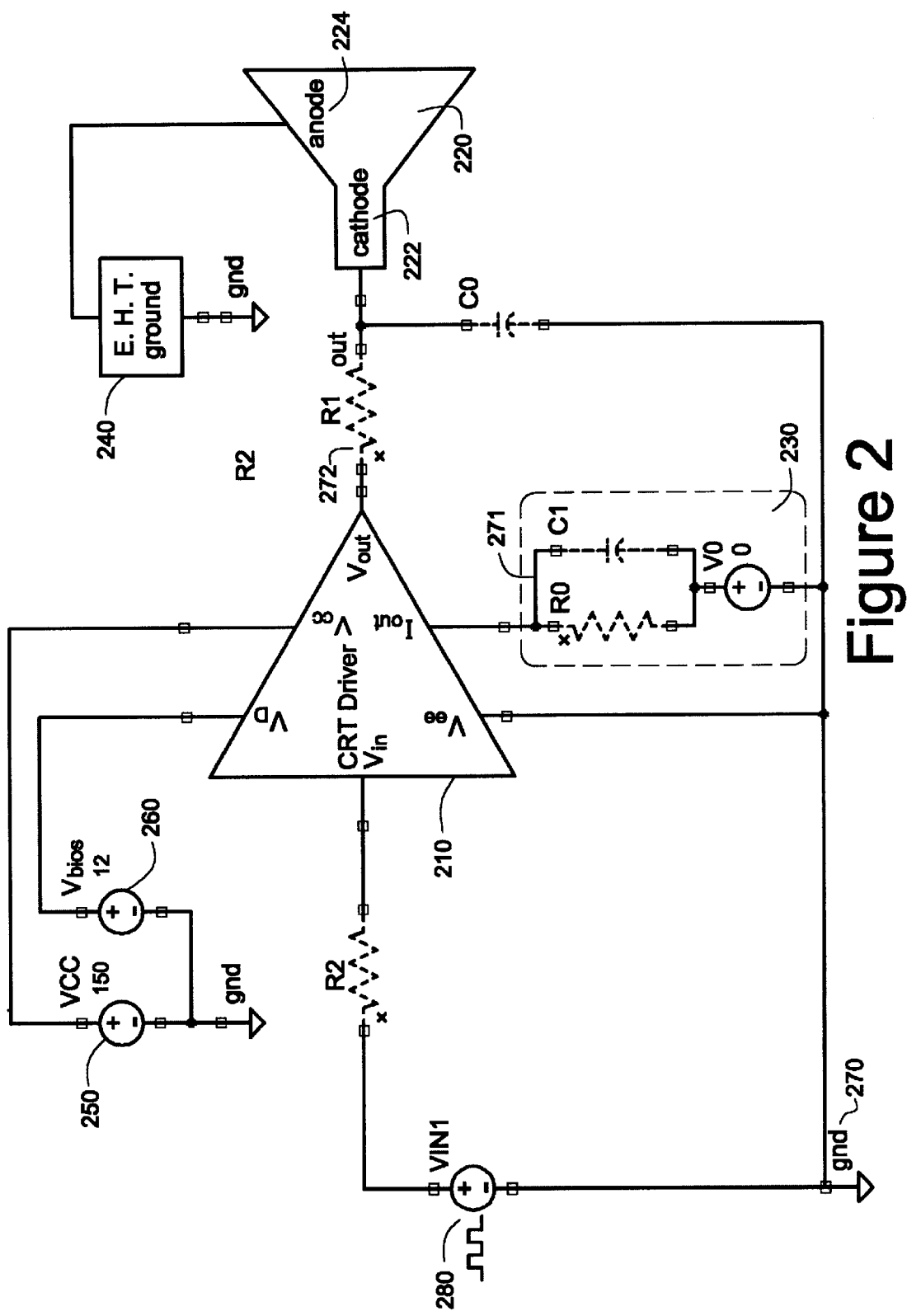
FIG. 2 is a block diagram of a cathode ray tube driver block with cathode current detection, in accordance with one embodiment of the present invention.

FIG. 2 is a schematic diagram of a television display system 200 showing a CRT driver block 210 driving a CRT block 220, in accordance with one embodiment of the present invention. The CRT driver block 210 amplifies a video input signal (Vin) from the input source 280 and outputs a video output signal (Vout) for driving a cathode electrode in the CRT block 220. The CRT block 220 displays images on a screen in response to a video signal (Vin) that is converted from a broadcast signal transmitted in a digital format, such as high definition television (HDTV) and enhanced definition television (EDTV).

The CRT driver block 210 is a dual supply amplifier. A high voltage supply (Vcc) 250 is coupled to the CRT driver block 210. Also a low voltage supply (Vb) 260 for biasing the amplifier in the CRT driver block 210 is coupled to block 210. It is appreciated that for a color system, there are three driver amplifiers (e.g., for driving red, green, and blue).

An extremely high voltage supply (e.g., 24,000 Volts) supplies the current at the anode 224 for the CRT block 220. An output at node 271 provides means for measuring the cathode current at the cathode electrode 222 of the CRT block 220. A current measuring block 230 measures the current from the potential created at the CRT driver current output at node 271.

Node 270 represents ground (Vee) for the circuit 200. The ground (Vee) sets the voltage swing for the output (Vout) at node 272 of the CRT driver block 210. As such, the voltage swing for Vout at node 272 is between the high supply voltage (Vcc) and ground (Vee).

Although embodiments of the present invention are discussed using a CRT for a HDTV, it is appreciated that other embodiments are well suited to using a CRT for any high resolution television displaying broadcast signals that are digitally formatted (e.g., EDTV).

The CRT driver block 210 is implemented as an integrated circuit to reduce the internal stray capacitance and external PCB trace capacitance effects. Smaller components inherently have less stray capacitance than its discrete counterparts. Implementing the CRT driver block as an integrated circuit allows for the CRT driver block to effectively operate under the higher frequencies, higher operating speeds, and wider bandwidths as required by the digital television formats (e.g., HDTV and EDTV) while limiting the negative effects of stray and PCB trace capacitance, such as reduced resolution.

Figure 3:
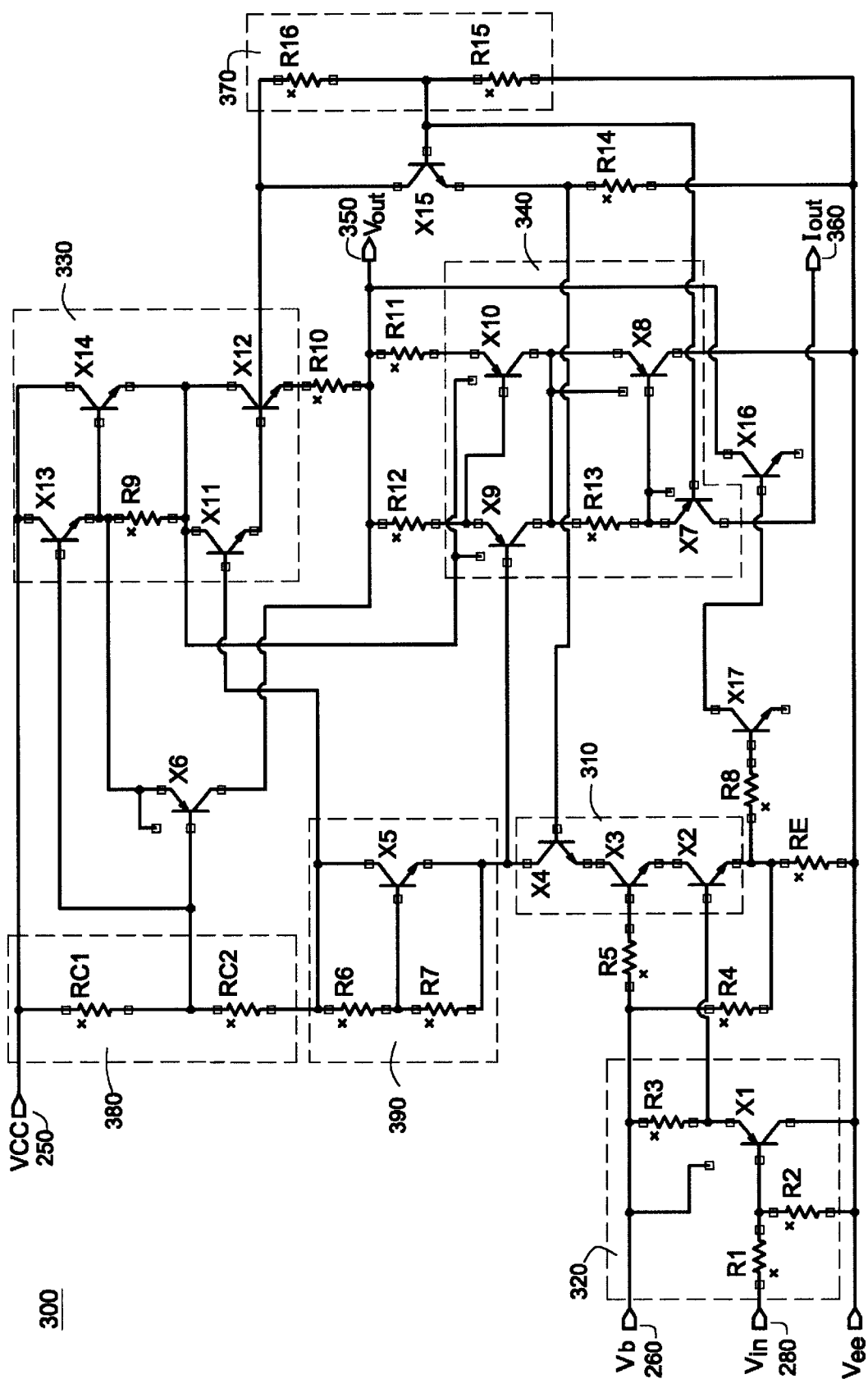
FIG. 3 is a schematic diagram of a cathode ray tube driver circuit with cathode current detection capabilities, in accordance with one embodiment of the present invention.

FIG. 3 is a schematic diagram of a CRT driver circuit 300 with cathode current detection capabilities, in accordance with one embodiment of the present invention. The CRT driver circuit 300 can be a simplified circuit diagram of the CRT driver block 210 of FIG. 2.

The high speed amplifier block 310 is configured as a cascode amplifier with three transistors, in accordance with one embodiment of the present invention. The fixed gain cascode amplifier is capable of higher operating speeds allowing it to operate at high supply voltages. The gain of the amplifier block 310 can be approximately calculated as follows: (RC1+RC2)/RE. The high speed amplifier block 310 is comprised of an NPN common emitter transistor X2 connected in cascode with a common base NPN transistor X3 that is further connected in cascode with a common base NPN transistor. A fixed base low voltage bias (Vb) is provided at node 260 to the base of the transistor X3 through a resistor R5.

The video input signal at Vin pin 280 is buffered at the input buffer stage 320, in accordance with one embodiment of the present invention. The input buffer stage 320 is comprised of a PNP emitter follower transistor X1 to isolate the gain amplifier block 310 from external circuitry. The video input signal at Vin pin 280 is connected to the base of the transistor X1 through a resistor R1. The collector of transistor X1 is coupled to ground (Vee). The emitter of the transistor X1 is coupled to the base of transistor X2 in the amplifier block 310 and to the low voltage supply (Vb) at node 260 through a resistor R3.

In order to make a high speed amplifier for HDTV applications, many Darlington transistor amplifier configurations are used so as to achieve better output current driving capability despite the external resistive and capacitive loads (e.g., the CRT), as is shown in FIG. 3. The CRT driver circuit 300 implements a push-pull configuration using an upper stage 330 of darlington configured PNP transistors, and a lower stage 340 of darlington configured NPN transistors, in accordance with one embodiment of the present invention.

In the lower stage 340, two pairs of darlington configured transistors are coupled in series. A first pair of darlington configured transistors comprises a prestage transistor X9 and an output transistor X10. A second pair of darlington configured transistors comprises a prestage transistor X7 and an output transistor X8. The second pair of transistors is coupled in series with the first pair of transistors. The lower stage 340 is comprised of two pairs of darlington configured transistors in order to achieve high operating voltage (e.g., Vcc at node 250). In addition, the lower stage 340 of CRT driver circuit 300 is comprised entirely of NPN transistors as one component of the push-pull configuration of the CRT driver circuit 300.

A lower prestage amplifier in the lower stage 340 is comprised of the two lower prestage transistors, X7 and X9 coupled in series. The output of the high speed amplifier block 310 at the collector of transistor X4 is coupled to the base of transistor X9 in the lower prestage of transistors. A CRT driver output (Vout) is coupled to the Vout pin 350 through a resistor R12. Vout pin 350 is coupled to a cathode electrode of a CRT to allow the Vout signal to drive the cathode electrode.

A lower output amplifier stage is comprised of the two lower output transistors X8 and X10 coupled in series. The lower output amplifier is biased as a Class B amplifier. As such, no quiescent collector currents exist. Hence, during static periods of the video input signal, the current throughout the lower stage 340 of darlington configured transistors is comprised essentially of the cathode current from the cathode electrode of the coupled CRT which is externally connected at the Vout pin 350.

The lower output amplifier stage only turns on during the transient periods of the video input signal. The transistors X8 and X10 turn on when the output voltage swings from high to low. This is in contrast to the upper output amplifier stage as will be discussed later.

The collector electrode at transistor X7 provides a cathode current output at Iout pin 360. Since the output transistors X8 and X10 in the lower output amplifier stage are turned off during static periods of the video input signal, the current measured at Iout pin 360 is essentially that of the cathode current measured at the Vout pin 350 with slight deviation for the beta value losses in output transistors X9 and X7.

For purposes of calibrating the electron gun in the CRT, a video test signal is inputted at the input node 280 that is essentially a DC input. The extremely long wavelength allows for a static signal to traverse across one scan line of the display. The cathode current measured at the Iout pin 360 is highly accurate, as the only conductive path from the cathode electrode coupled to output pin 350 is through the lower prestage amplifiers consisting of transistors X7 and X9.

In the upper stage 330, two pairs of darlington configured transistors are coupled in series. A third pair of darlington configured transistors comprises a prestage transistor X13 and an output transistor X14. A fourth pair of darlington configured transistors comprises a prestage transistor X11 and an output transistor X12. The upper stage 330 is comprised of two pairs of darlington configured transistors in order to achieve high operating voltage (e.g., Vcc at node 250).

An upper prestage amplifier stage is comprised of the two upper prestage transistors, X13 and X11 coupled in series. The upper prestage transistors in the upper stage 330 are comprised of PNP transistors to complete the complementary push-pull amplifier configuration.

An upper output amplifier stage is comprised of the two upper output transistors X14 and X12 coupled in series. The upper output amplifier is also biased as a Class B amplifier. As such, no quiescent collector currents exist. The upper output amplifier only turns on during the transient periods of the video input signal (Vin). The transistors X12 and X14 turn on when the output voltage swings from low to high, which is in contrast to the lower output amplifier stage.

Thus, the Class B amplifiers in the upper and lower output amplifiers allow for the CRT driver circuit 300 to charge and discharge the external capacitances during both the falling and rising edges of the voltage from the video input signal. As such, the Class B amplifiers in the upper and lower output amplifier stages increase the operating speed of the CRT driver circuit 300 in order to run at the higher video signal frequencies of the digital broadcasting formats.

The high voltage supply (Vcc) at node 250 is coupled to both the collector electrodes of transistors X13 and X14 in the third pair of darlington configured transistors in the upper stage 330 of FIG. 3.

Biasing of the upper output amplifier and the lower output amplifier to Class B is controlled by the collector-to-emitter voltage of transistor X5 in the diode multiplier block 390, in accordance with one embodiment of the present invention. This collector-to-emitter voltage is approximately no more than 1 volt and biases the output transistors X14, X12, X10 and X8 so that the upper and lower output amplifiers are ready to turn on in their respective transient periods of the video input cycles.

Continuing with FIG. 3, the upper prestage amplifier comprised of transistors X13 and X11 also drive a voltage divider block 370. The voltage divider block 370 splits the high supply voltage (Vcc) at node 250 between the transistors X9 and X7 in the lower prestage amplifier. This allows the CRT driver circuit 300 to operate at much higher voltages. In one embodiment, the voltage divider 370 approximately splits the high voltage supply (Vcc) equally between the transistors X9 and X7.

Furthermore, a voltage divider block 380 splits the high voltage supply (Vcc) at node 250 between the transistors X11 and X13 in the upper prestage amplifier. This also allows the CRT driver circuit 300 to operate at much higher voltages as required by the digital formatted televisions, such as HDTVs. In one embodiment, the voltage divider 380 approximately slits the high voltage supply (Vcc) equally between the transistors X11 and X13.

In one embodiment, the resistors RC1 and RC2, in voltage divider block 380, and R15 and R16 in voltage divider block 370, are representative of resistors as described in the U.S. Pat. No. 5,977,610 by the same inventor, titled "Integrated Circuit Having Resistor Formed Over Multiple Tubs of Semiconductor Material."

Although embodiments of the present invention are discussed using NPN and PNP bipolar junction transistors (BJTs), it is appreciated that other embodiments are well suited to using other transistors suitable for amplifying a signal (e.g., MOSFETS, JFETS, etc.).

Figure 4:
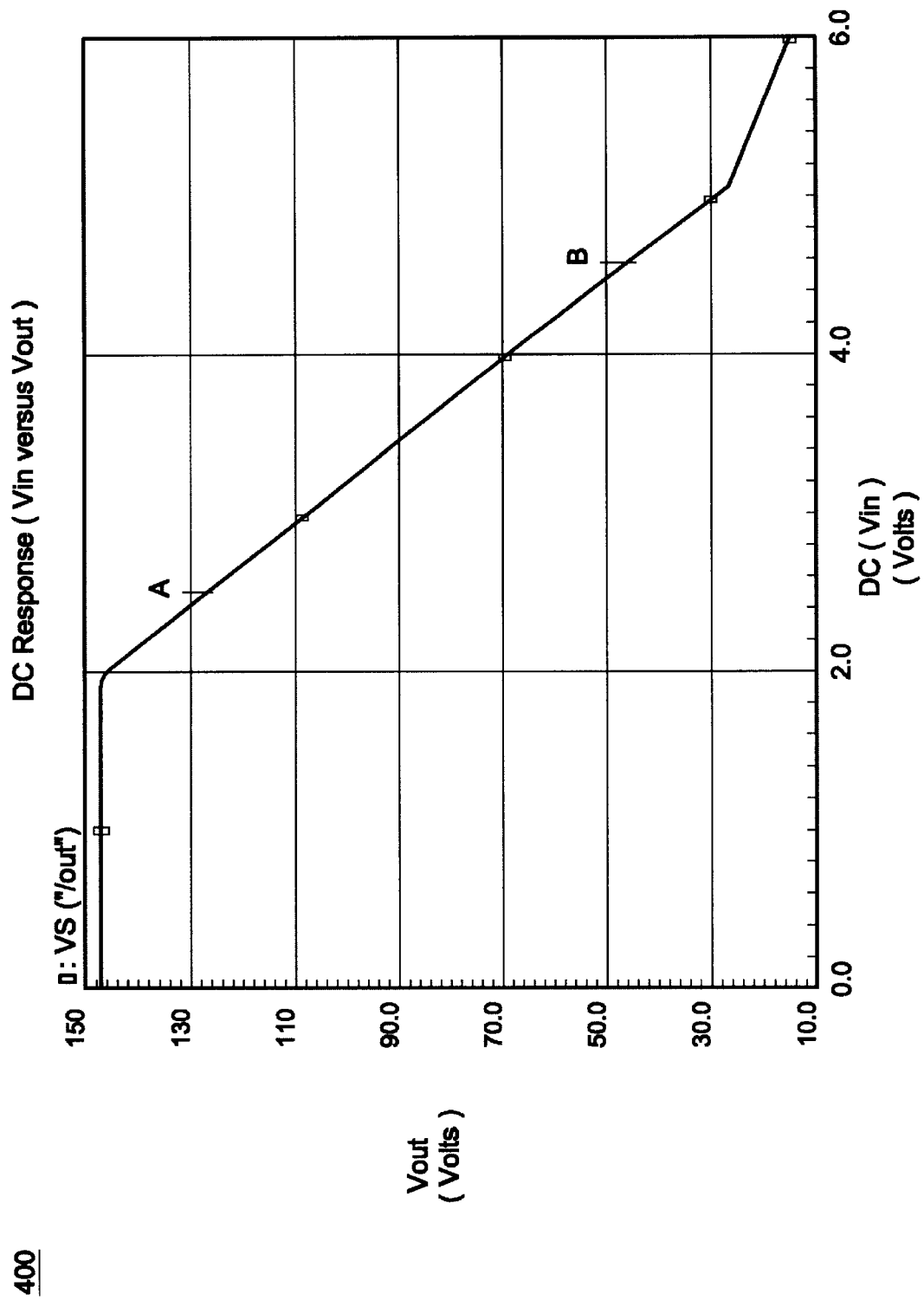
FIG. 4 is a graphical chart illustrating the output potential of the cathode ray tube driver circuit of FIG. 3 as a function of a DC input potential showing amplification, in accordance with one embodiment of the present invention.

FIG. 4 is a graphical chart illustrating the output potential of the Vout pin 350 of FIG. 3 as a function of a DC input at the Vin pin 280, in accordance with one embodiment of the present invention. FIG. 4 shows a high gain in amplification of the input signal at the Vin pin 280. In the active region of the amplifier in CRT driver circuit 300, an output swing from approximately 130 volts to 50 volts in response to DC inputs of 2.5 volts (point A) to 4.5 volts (point B) is achieved. The gain is suitable for driving the cathode electrode of a CRT in response to digital broadcast signals, such as signals for HDTV, EDTV, etc.

Figure 5:
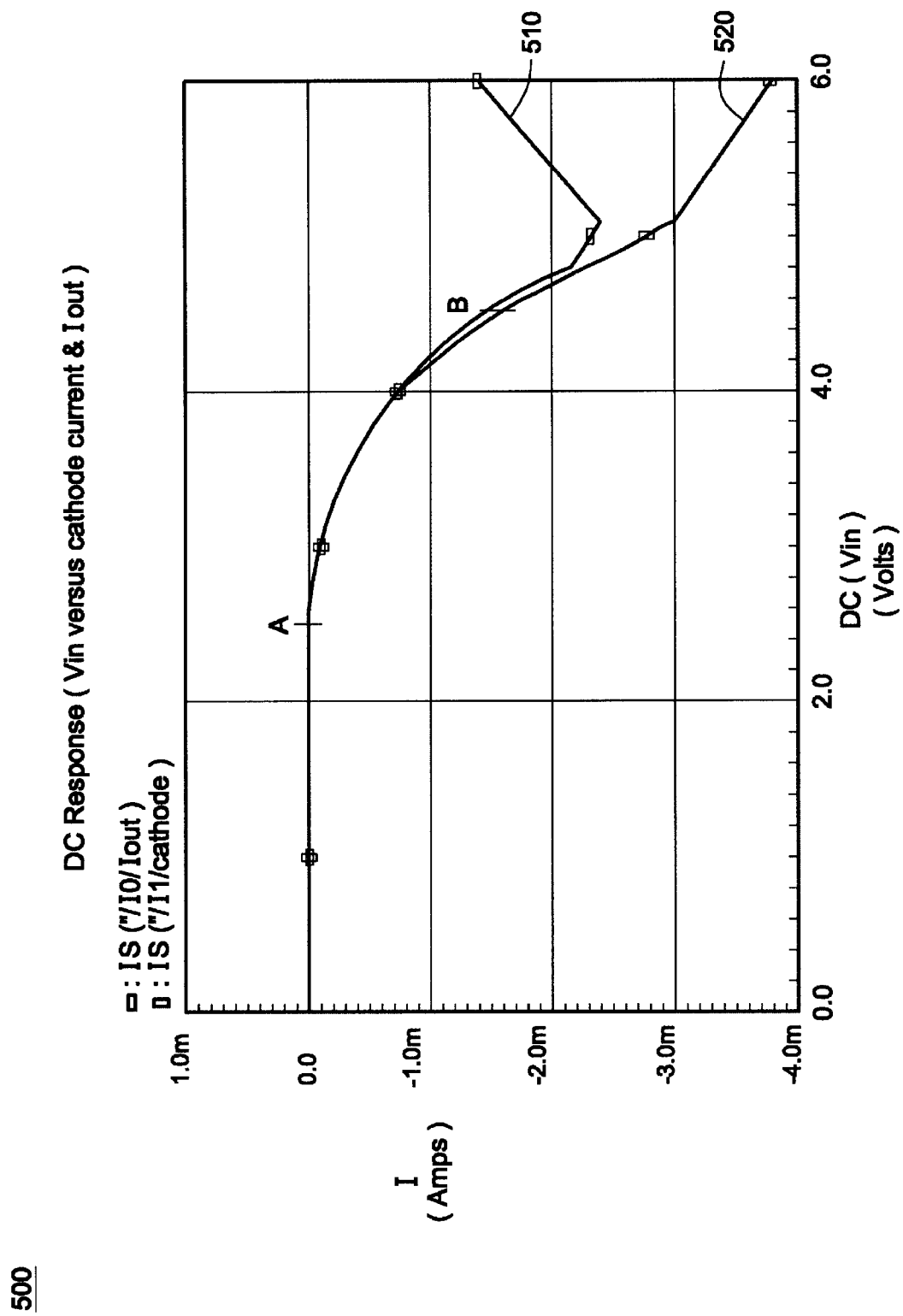
FIG. 5 is a graphical chart illustrating the output current of the cathode ray tube driver circuit of FIG. 3 as a function of a DC input potential comparing cathode current with the measured current, in accordance with one embodiment of the present invention.

FIG. 5 is a graphical chart illustrating the output current of the cathode ray tube driver circuit of FIG. 3 as a function of a DC input potential comparing cathode current with the measured current, in accordance with one embodiment of the present invention. Line 510 represents the current measured at the Iout pin 360 of FIG. 3. Line 520 represents the current measured at the cathode of the CRT, which effectively is the Vout pin 350.

In the active region of the amplifier, approximately between point A at 2.5 volts and point B at 4.5 volts, the measured current at both the Iout pin 360 and the cathode electrode (Vout pin 350) are nearly identical. The variation in current is due to the Beta values of the lower prestage transistors X7 and X9. Thus, the CRT driver circuit 300 provides for accurate readings of cathode current from a coupled CRT electrode of a CRT with high resolution display capabilities.

Figure 6:
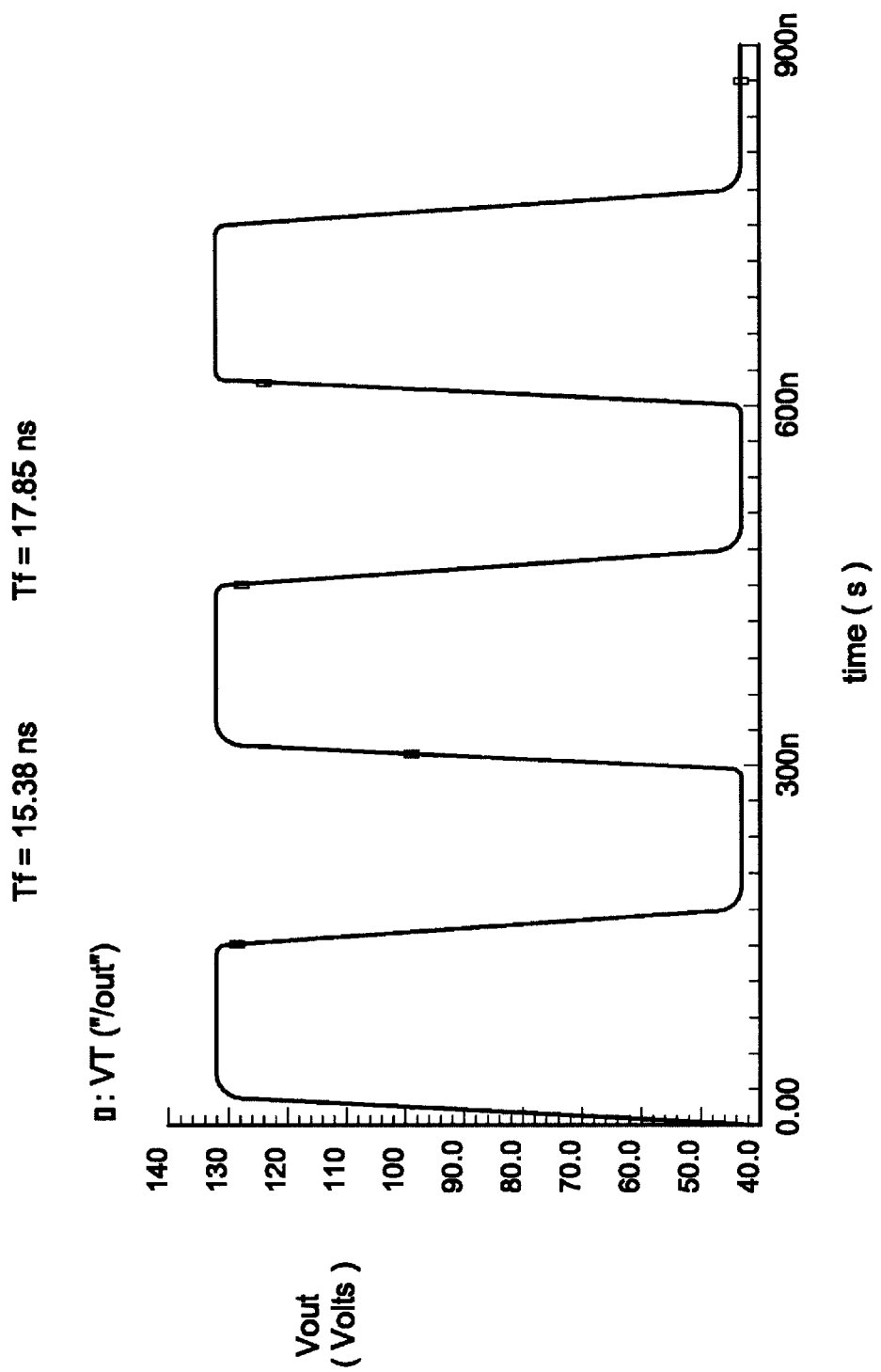
FIG. 6 is a graphical chart illustrating the output potential of the cathode ray tube driver circuit of FIG. 3 as a function of time, in response to a square wave input potential, in accordance with one embodiment of the present invention.

FIG. 6 is a graphical chart 600 representing the output potential of the Vout pin 350 of the CRT driver circuit 300 of FIG. 3 as a function of time, in accordance with one embodiment of the present invention. The output potential is in response to a square wave input potential (Vin) having a period of 300 nsec.

FIG. 6 shows the CRT driver circuit 300 has a rise time of 15.38 ns and a fall time of 17.85 ns. The rise time and fall time values for CRT driver circuit 300 show a high speed amplifier capable of driving a CRT for a digitally formatted television, such as an HDTV, EDTV, etc.

The preferred embodiment of the present invention, a cathode ray tube driver circuit with cathode detection capabilities suitable for high resolution display applications, is thus described. While the present invention has been described in particular embodiments, it should be appreciated that the present invention should not be construed as limited by such embodiments, but rather construed according to the below claims.

What is claimed is:

1. A cathode ray tube driver (CRT driver) circuit with cathode current detection, comprising:
   a video amplifier having an amplifier signal output electrode for amplifying a video input signal;
   a lower prestage circuit coupled to said amplifier signal output electrode for generating a video output signal in response to said video input signal at a CRT driver output electrode, said video output signal driving a coupled CRT cathode electrode, said lower prestage circuit comprising a first prestage transistor coupled in series with a second prestage transistor, said second prestage transistor having a collector output electrode for measuring current from said CRT cathode electrode; and
   a first voltage divider being coupled to said lower prestage circuit and a high supply voltage via an upper prestage circuit for splitting said high supply voltage between said first and second prestage transistors, said upper prestage circuit driving said voltage divider and comprising a third prestage transistor coupled in series with a fourth prestage transistor.

2. A CRT driver circuit as described in claim 1, further comprising a lower stage of darlington configured transistors comprising:
   a first pair of transistors arranged in darlington configuration including said first prestage transistor and a first output transistor, said first prestage transistor coupled to said CRT driver signal output; and
   a second pair of transistors arranged in darlington configuration coupled in series to said first pair of transistors, said second pair of transistors including said second prestage transistor and a second output transistor, wherein said first and second prestage transistors form said lower prestage circuit, said first and second output transistors coupled in series forming a lower output stage circuit that is electrically active only during transient signal periods.

3. A CRT driver circuit as described in claim 1, further comprising an upper stage of darlington configured transistors comprising:
   a third pair of transistors arranged in darlington configuration including said third prestage transistor and a third output transistor, said third prestage transistor coupled to said high supply voltage; and
   a fourth pair of transistors arranged in darlington configuration coupled in series to said third pair of transistors, said fourth pair of transistors including said fourth prestage transistor and a fourth output transistor, said fourth prestage transistor coupled to said voltage divider, wherein said third and fourth prestage transistors form said upper prestage circuit, and said third and fourth output transistors coupled in series form an upper output stage circuit that is electrically active only during transient signal periods.

4. The CRT driver circuit as described in claim 1, further comprising:
   a current detection circuit coupled to said collector output electrode for measuring said current from said CRT cathode electrode.

5. The CRT driver circuit as described in claim 1, wherein said CRT driver circuit is implemented in integrated circuit form.

6. The CRT driver circuit as described in claim 1, wherein said video output signal drives a CRT for a high definition television (HDTV).

7. The CRT driver circuit as described in claim 1, wherein said video output signal drives a CRT for an enhanced definition television (EDTV).

8. The CRT driver circuit as described in claim 1, wherein said video amplifier further comprises three transistors coupled in cascode configuration.

9. The CRT driver circuit as described in claim 1, wherein said first voltage divider approximately splits said high supply voltage equally between said first and second prestage transistors.

10. A CRT driver circuit as described in claim 1, further comprising:
    a second voltage divider being coupled to said upper prestage circuit and said high supply voltage for splitting said high supply voltage between said third and fourth prestage transistors.

11. The CRT driver circuit as described in claim 2, further comprising an upper stage of darlington configured transistors comprising:

a third pair of transistors arranged in darlington configuration including said third prestage transistor and a third output transistor, said third prestage transistor coupled to said high supply voltage;

a fourth pair of transistors arranged in darlington configuration coupled in series to said third pair of transistors, said fourth pair of transistors including said fourth prestage transistor and a fourth output transistor, said fourth prestage transistor coupled to said voltage divider, wherein said third and fourth prestage transistors form said upper prestage circuit, and said third and fourth output transistors coupled in series form an upper output stage circuit that is electrically active only during transient signal periods, said upper output stage coupled to said lower output stage; and a diode multiplier transistor coupled to said amplifier signal output and to said upper output stage and said lower output stage for biasing said first, second, third, and fourth output transistors barely off so that said upper and lower output stages are electrically active only during transient signal periods.

12. The CRT driver circuit as described in claim 11, wherein said first pair of transistors are PNP bipolar junction transistors (BJTs), said second pair of transistors are PNP BJTs, said third pair of transistors are NPN BJTs, and said fourth pair of transistors are NPN BJTs.

13. A cathode ray transmission (CRT) driver integrated circuit comprising:

a video amplifier having an amplifier signal output electrode for amplifying a video input signal;

a first pair of transistors arranged in darlington configuration, including a first prestage transistor, coupled to said amplifier signal output electrode and a CRT driver signal output electrode;

a second pair of transistors arranged in darlington configuration, including a second prestage transistor, coupled in series to said first pair of transistors;

a lower prestage circuit including said first and second prestage transistors coupled in series for generating a video output signal in response to said video input signal at said CRT driver output electrode to drive a coupled CRT cathode electrode of a CRT, said second prestage transistor having a collector output electrode for measuring current proportionally from said CRT cathode electrode during non-transient periods of said video input signal, and a first voltage divider coupled to said lower prestage circuit and to a high voltage supply for splitting said high voltage supply between said first and second prestage transistors.

14. The CRT driver integrated circuit as described in claim 13, wherein said first voltage divider approximately splits said high voltage supply equally between said first and second pair of transistors.

15. The CRT driver integrated circuit as described in claim 13, further comprising a current measuring circuit coupled to said collector output electrode for measuring actual current from said CRT cathode electrode during transient periods of said video input signal.

16. The CRT driver integrated circuit as described in claim 13, further comprising an input buffer for isolating said CRT driver integrated circuit from external circuitry.

17. The CRT driver integrated circuit as described in claim 13, further comprising a lower output stage circuit including a first output transistor, from said first pair of transistors, coupled in series with a second output transistor, from said second pair of transistors, said lower output stage circuit electrically active only during transient signal periods of said video input.

18. The CRT driver integrated circuit as described in claim 17, further comprising:

a third pair of transistors arranged in darlington configuration, including a third prestage transistor, coupled to said amplifier signal output electrode and said high voltage supply;

a fourth pair of transistors arranged in darlington configuration, including a fourth prestage transistor, coupled in series to said third pair of transistors and coupled to said first voltage divider;

an upper output stage circuit including a third output transistor from said third pair of transistors coupled in series with a fourth output transistor from said fourth pair of transistors, said upper output stage circuit electrically active only during transient signal periods of said video input signal;

a diode multiplier transistor coupled to said amplifier signal output electrode and to said fourth prestage transistor, and to said first prestage transistor for biasing said first, second, third, and fourth output transistors off so that said upper and lower output stage circuits are electrically active only during transient periods of said video input signal.

19. The CRT driver integrated circuit as described in claim 13, further comprising:

a third pair of transistors arranged in darlington configuration, including a third prestage transistor, coupled to said amplifier signal output electrode and said high voltage supply;

a fourth pair of transistors arranged in darlington configuration, including a fourth prestage transistor, coupled in series to said third pair of transistors and coupled to said first voltage divider; and an upper prestage circuit including said third prestage transistor coupled in series with said fourth prestage transistor, said upper prestage circuit coupled with said first voltage divider and controlling said first voltage divider.

20. The CRT driver integrated circuit as described in claim 19, further comprising:

an upper output stage circuit including a third output transistor, from said third pair of transistors, coupled in series with a fourth output transistor, from said fourth pair of transistors, said upper output stage circuit electrically active only during transient signal periods of said video input signal.

21. The CRT driver integrated circuit as described in claim 19, further comprising a second voltage divider circuit for splitting said high supply voltage between said third and fourth prestage transistors.

* * * * *